US011418072B2

(12) United States Patent
Tan et al.

(10) Patent No.: US 11,418,072 B2
(45) Date of Patent: Aug. 16, 2022

(54) PERMANENT MAGNET ASSISTED SYNCHRONOUS RELUCTANCE MOTOR AND ELECTRIC CAR HAVING THE SAME

(71) Applicant: Gree Electric Appliances, Inc. of Zhuhai, Guangdong (CN)

(72) Inventors: Jianming Tan, Guangdong (CN); Yusheng Hu, Guangdong (CN); Bin Chen, Guangdong (CN); Yong Xiao, Guangdong (CN); Suhua Lu, Guangdong (CN); Tong Tong, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 101 days.

(21) Appl. No.: 16/975,614

(22) PCT Filed: Dec. 7, 2018

(86) PCT No.: PCT/CN2018/119821
§ 371 (c)(1),
(2) Date: Aug. 25, 2020

(87) PCT Pub. No.: WO2019/214224
PCT Pub. Date: Nov. 14, 2019

(65) Prior Publication Data
US 2021/0006106 A1    Jan. 7, 2021

(30) Foreign Application Priority Data
May 8, 2018    (CN) .......................... 201810432518.0

(51) Int. Cl.
*H02K 1/24*    (2006.01)
*H02K 19/10*    (2006.01)

(52) U.S. Cl.
CPC ........... *H02K 1/246* (2013.01); *H02K 19/103* (2013.01); *H02K 2213/03* (2013.01)

(58) Field of Classification Search
CPC .. H02K 1/246; H02K 19/103; H02K 2213/03; H02K 1/2766; H02K 1/24; H02K 29/03; Y02T 10/64

(Continued)

(56) References Cited

U.S. PATENT DOCUMENTS 5,656,922 A    8/1997    LaVelle et al.
7,755,243 B2    7/2010    Mizutani et al.
(Continued)

FOREIGN PATENT DOCUMENTS

CN    101123370 A    2/2008
CN    104600938 A    5/2015
(Continued)

OTHER PUBLICATIONS

Sanada et al., Torque Ripple Improvement for Synchronous Reluctance Motor Using Asymmetric Flux Barrier Arrangement, Conference Record of the 2003 IEEE Industry Applications Conference, 38th. IAS Annual Meeting, Salt Lake City, UT, Oct. 12, 2003, pp. 250-255, vol. 1, DOI: 10.1109/IAS.2003.1257510.

*Primary Examiner* — Ahmed Elnakib
(74) *Attorney, Agent, or Firm* — The Webb Law Firm

(57)    ABSTRACT

The present disclosure provides a permanent magnet assisted synchronous reluctance motor and an electric car having the same. The permanent magnet assisted synchronous reluctance motor includes: a stator body, wherein a plurality of stator teeth are provided on an inner circumferential surface of the stator body, and a stator slot is formed between two adjacent stator teeth; a rotor body disposed within the stator body and opened with a group of permanent magnet slots, which include a plurality of permanent magnet (Continued)

slots, wherein a first end of at least one of the plurality of permanent magnet slots and an end of one of the plurality of stator teeth are arranged oppositely, and a second end of the permanent magnet slot and the stator slot formed by two adjacent stator teeth among remaining stator teeth are arranged oppositely.

9 Claims, 2 Drawing Sheets

(58) Field of Classification Search
 USPC .......................................................... 310/168
 See application file for complete search history.

(56) References Cited

U.S. PATENT DOCUMENTS

| | | |
|---|---|---|
| 2016/0308428 A1 | 10/2016 | Xiao |
| 2016/0352161 A1 | 12/2016 | Lange et al. |
| 2017/0040855 A1* | 2/2017 | Saint-Michel ....... H02K 21/145 |

FOREIGN PATENT DOCUMENTS

| | | |
|---|---|---|
| CN | 105914925 A | 8/2016 |
| CN | 108429373 A | 8/2018 |
| FR | 2973179 A1 | 9/2012 |

* cited by examiner

PERMANENT MAGNET ASSISTED SYNCHRONOUS RELUCTANCE MOTOR AND ELECTRIC CAR HAVING THE SAME

CROSS-REFERENCE TO RELATED APPLICATIONS

This application is the United States national phase of International Application No. PCT/CN2018/119821 filed Dec. 7, 2018, and claims priority to Chinese Patent Application No. 201810432518.0 filed May 8, 2018, the disclosures of which are hereby incorporated by reference in their entirety.

BACKGROUND OF THE INVENTION

Field of the Invention

The present disclosure relates to the technical field of devices of an electric car, and in particular, to a permanent magnet assisted synchronous reluctance motor and an electric car having the same.

Description of Related Art

The electric car which has characteristics such as energy saving and environmental protection, has developed rapidly. In order to realize the functions of the driving motor of electric car known to the inventors, such as high power density and high efficiency, more and more electric motors employ high-performance rare earth permanent magnet motors. The rare earth permanent magnet motors which can achieve high efficiency and high power density, mainly depend on high-performance rare earth permanent magnets, among which neodymium iron boron rare earth permanent magnets are the most widely used at present. However, rare earth is a non-renewable resource with a more expensive price, and the price of rare earth also fluctuates greatly, thereby resulting in a higher production cost of a driving motor of an electric car. Further, a ferrite permanent magnet assisted synchronous reluctance motor is also applied to an electric car in the art known to the inventors.

SUMMARY OF THE INVENTION

According to one aspect of the present disclosure, a permanent magnet assisted synchronous reluctance motor is provided. The motor includes a stator body, wherein a plurality of stator teeth are provided on an inner circumferential surface of the stator body, and a stator slot is formed between two adjacent stator teeth; a rotor body disposed within the stator body and opened with a group of permanent magnet slots, which include a plurality of permanent magnet slots, wherein a first end of at least one of the plurality of permanent magnet slots and an end of one of the plurality of stator teeth are arranged oppositely, and a second end of the permanent magnet slot and the stator slot formed by two adjacent stator teeth among remaining stator teeth are arranged oppositely.

In some embodiments, the plurality of permanent magnet slots include: an inner-layer permanent magnet slot, wherein a first end of the inner-layer permanent magnet slot and an end of one of the plurality of stator teeth are arranged oppositely, a second end of the inner-layer permanent magnet slot and the stator slot formed by the two adjacent stator teeth among the remaining stator teeth are arranged oppositely, and a middle of the inner-layer permanent magnet slot is arranged to protrude toward one side of a shaft hole of the rotor body.

In some embodiments, the plurality of permanent magnet slots further include: an outer-layer permanent magnet slot located outside the inner-layer permanent magnet slot, wherein a first end of the outer-layer permanent magnet slot and the first end of the inner-layer permanent magnet slot are arranged adjacently, and the first end of the outer-layer permanent magnet slot and an end of the stator tooth formed within both ends of the inner-layer permanent magnet slot are arranged oppositely, a second end of the outer-layer permanent magnet slot and the second end of the inner-layer permanent magnet slot are arranged adjacently, the second end of the outer-layer permanent magnet slot and the stator slot formed within both ends of the inner-layer permanent magnet slot are arranged oppositely, and a middle of the outer-layer permanent magnet slot is arranged to protrude toward one side of a shaft hole of the rotor body.

In some embodiments, the rotor body has a first quadrature axis and a second quadrature axis, the first end of the inner-layer permanent magnet slot and the first quadrature axis are arranged adjacently, the second end of the inner-layer permanent magnet slot and the second quadrature axis are arranged adjacently, wherein a distance between a surface of the first end of the inner-layer permanent magnet groove proximate to the first quadrature axis and the first quadrature axis is D1, and a distance between a surface of the second end of the inner-layer permanent magnet slot proximate to the second quadrature axis and the second quadrature axis is D2, where D1>D2.

In some embodiments, a geometric center line of the first end of the permanent magnet slot along a radial direction of the rotor body coincides with a geometric center line of the stator tooth along the radial direction of the stator body, and a geometric center line of the first end of the permanent magnet slot along the radial direction of the rotor body coincides with a geometric center line of the stator slot along the radial direction of the stator body.

In some embodiments, an amount of the stator slot is Q, and a pole number of the rotor body is 2P, and a phase number of the permanent magnet assisted synchronous reluctance motor is m, where $Q/2P/m=t$, $t\in(1.5, 2, 2.5, 3)$.

In some embodiments, there are a plurality of inner-layer permanent magnet slots, which are arranged at intervals along a radial direction of the rotor body.

In some embodiments, the permanent magnet assisted synchronous reluctance motor further includes: a permanent magnet disposed within the permanent magnet slot.

In some embodiments, there are a plurality of groups of permanent magnet slots, which are arranged at intervals along a circumferential direction of the rotor body, wherein two adjacent groups of permanent magnet slots include a first permanent magnet slot and a second permanent magnet slot adjacent to each other, a first end of the first permanent magnet slot and an end of one of the plurality of stator teeth are arranged oppositely, and a first end of the second permanent magnet slot adjacent to the first end of the first permanent magnet slot and the stator slot formed by the two adjacent stator teeth among remaining stator teeth are arranged oppositely.

According to another aspect of the present disclosure, an electric car is provided. The electric car includes a permanent magnet assisted synchronous reluctance motor, wherein the permanent magnet assisted synchronous reluctance motor is the permanent magnet assisted synchronous reluctance motor described above.

BRIEF DESCRIPTION OF THE DRAWINGS

The accompanying drawings of the description that constitute a part of the present disclosure, are used to provide a further understanding of the present disclosure. The illustrative embodiments of the present disclosure as well as the descriptions thereof, which are used for explaining the present disclosure, do not constitute improper definitions on the present disclosure. In the accompanying drawings.

Figure 1:
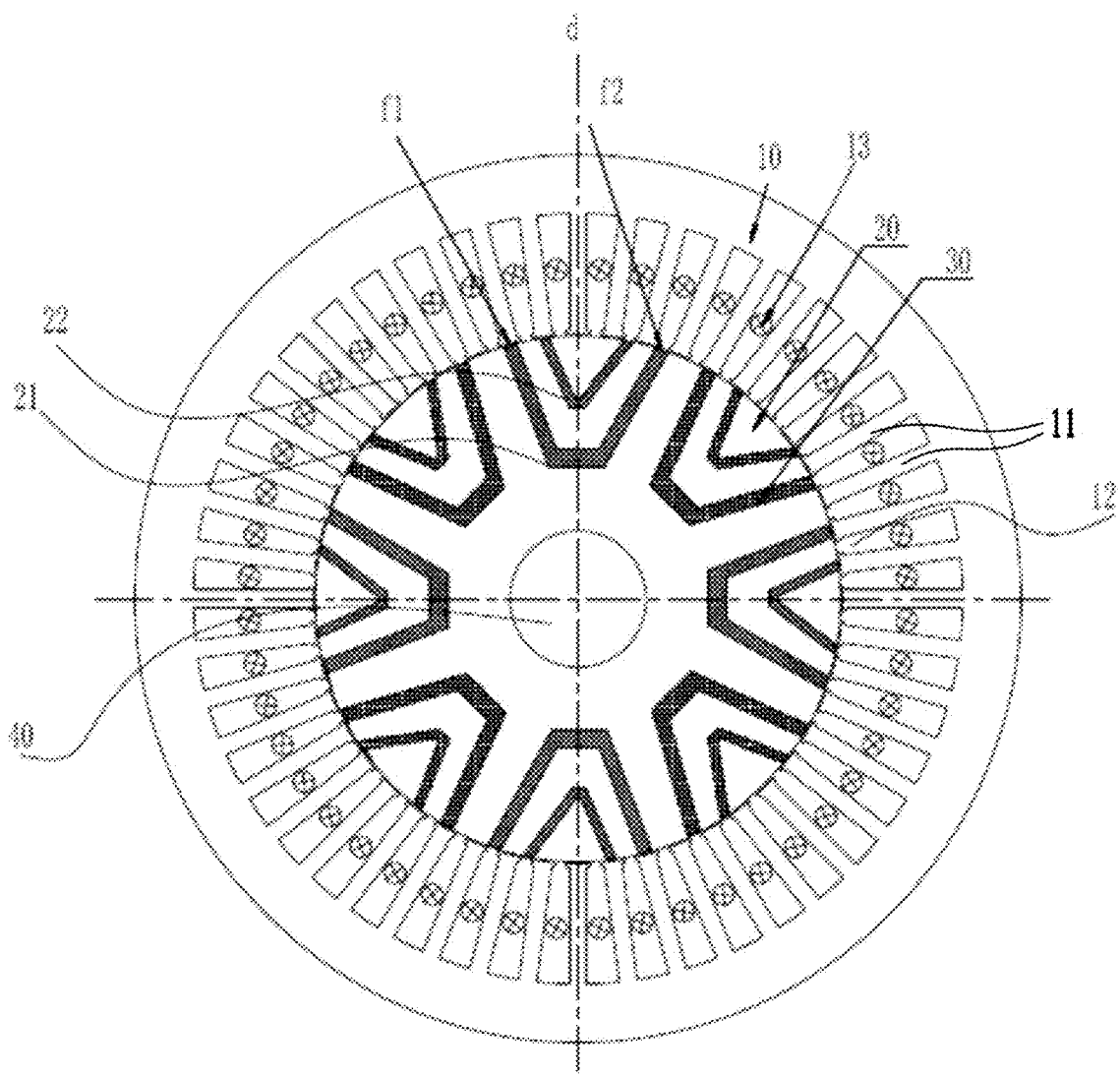
FIG. 1 shows a schematic structural view of a first embodiment of the motor according to the present disclosure.

Among them, the above-described accompanying drawings include the following reference signs:
10: stator body; 11: stator tooth; 12: stator slot; 13: stator winding;
20: rotor body; 21: inner-layer permanent magnet slot; 22: outer-layer permanent magnet slot;
30: permanent magnet;
40: shaft hole.

DESCRIPTION OF THE INVENTION

It should be noted that, in the case without a conflict, the embodiments in the present disclosure and the features in the embodiments may be combined with each other. The present disclosure will be described in detail below with reference to the accompanying drawings and in conjunction with the embodiments.

It is to be noted that the terms used here are only for the purpose of describing particular embodiments, and are not intended to limit the exemplary embodiments according to the present disclosure. As used here, the singular forms are also intended to include plural forms unless otherwise specified additionally in the context. In addition, it should also be understood that when the term "contain" and/or "include" is used in the present specification, it is intended to indicate the presence of features, steps, operations, devices, assemblies, and/or combinations thereof.

It should be noted that the terms "first", "second" and the like in the specification and claims of the present disclosure and the accompanying drawings are used to distinguish similar objects, and are not necessarily used to describe a specific order or sequence. It is to be understood that the terms thus used are interchangeable as appropriate, such that the embodiments of the present disclosure described here can be implemented, for example, in a sequence other than those illustrated or described here. In addition, the terms "include" and "have" as well as any of their deformations are intended to cover a non-exclusive inclusion. For example, the process, method, system, product, or device that contains a series of steps or units is not necessarily limited to those steps or units that are explicitly listed, but may include other steps or units that are not explicitly listed or that are inherent to such processes, methods, products or devices.

For ease of description, spatially relative terms such as "over", "above", "on an upper surface of", "upper", and the like, may be used here to describe the spatial positional relationship of one device or feature shown in the accompanying drawings with other devices or features. It should be understood that, the spatially relative terms are intended to contain different orientations in use or operation in addition to the orientation of the device described in the accompanying drawings. For example, if the device in the accompanying drawings is inverted, the device described to be "above other devices or configurations" or "over other devices or configurations" will be positioned "below other devices or configurations" or "under other devices or configurations". Thus, the exemplary term "above" may include both orientations including "above" and "below". The device may also be positioned in other different manners (rotated 90 degrees or at other orientations), and the relative descriptions of the space used here are interpreted accordingly.

Exemplary embodiments according to the present disclosure will now be described in more detail with reference to the accompanying drawings. However, these exemplary embodiments may be embodied in multiple different forms, and should not be construed as being limited to only the embodiments set forth here. It is to be understood that these embodiments are provided so that the disclosure of the present disclosure will be thorough and complete, and the concept of these exemplary embodiments will be fully conveyed to those skilled in the art. In the accompanying drawings, for the sake of clarity, it is possible to enlarge the thickness of layers and areas, and use the same reference sign to present the same component, so that the description thereof will be omitted.

A ferrite permanent magnet assisted synchronous reluctance motor is also applied to an electric car in the art known to the inventors. After research, such motor has problems such as much noise, easy demagnetization, and low efficiency.

In view of this, a permanent magnet assisted synchronous reluctance motor and an electric car having the same are provided to solve the problem of low efficiency of the motor.

Figure 2:
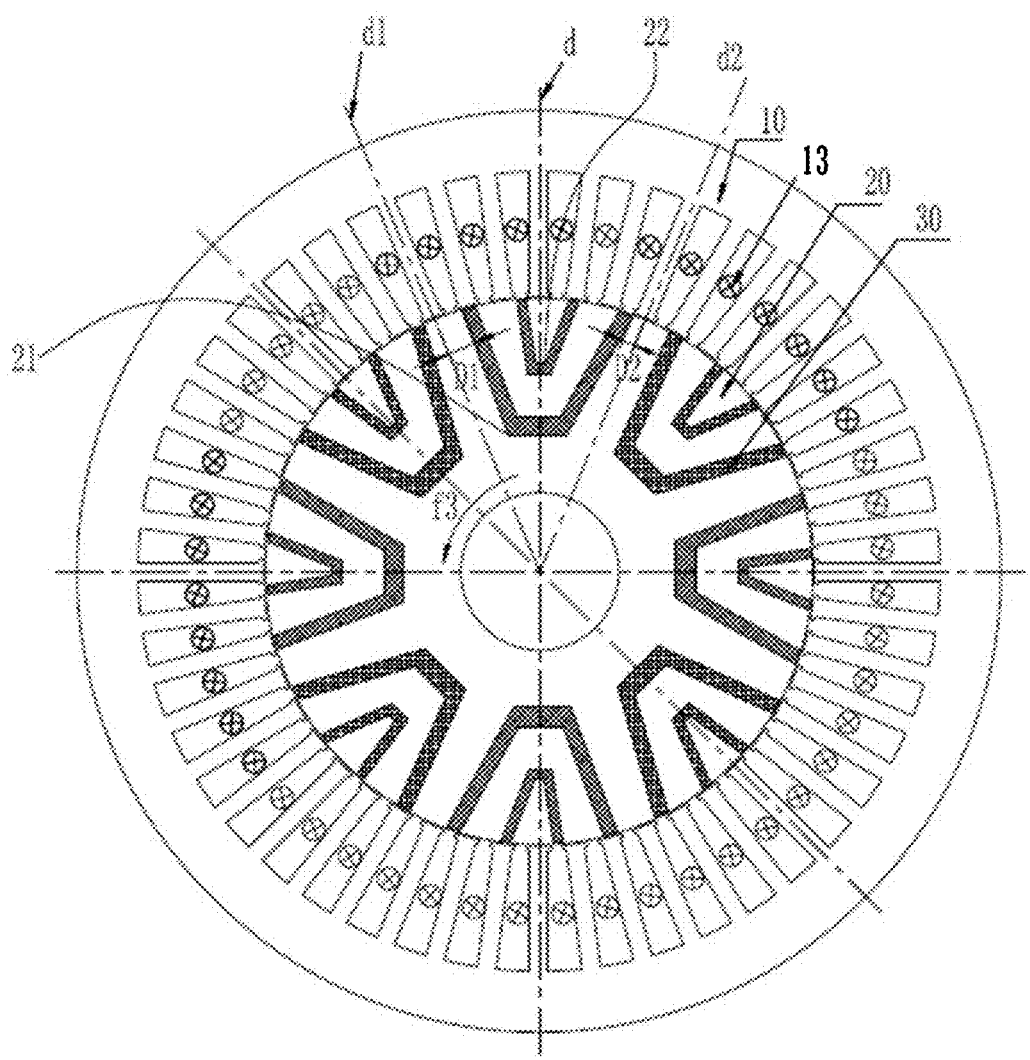
FIG. 2 shows a schematic structural view of a second embodiment of the motor according to the present disclosure.

In conjunction with FIGS. 1 and 2, according to an embodiment of the present disclosure, a permanent magnet assisted synchronous reluctance motor is provided.

In some embodiments, the permanent magnet assisted synchronous reluctance motor (hereinafter referred to as a motor) includes a stator body 10 and a rotor body 20. A plurality of stator teeth 11 are provided on an inner circumferential surface of the stator body 10, and a stator slot 12 is formed between two adjacent stator teeth 11. The rotor body 20 is disposed within the stator body 10. The rotor body 20 is opened with a group of permanent magnet slots, which include a plurality of permanent magnet slots. A first end of at least one of the plurality of permanent magnet slots and an end of one of the stator teeth 11 are arranged oppositely, and a second end of the permanent magnet slot and the stator slot 12 formed by the two adjacent stator teeth 11 among the remaining stator teeth 11 are arranged oppositely.

In the present embodiment, the permanent magnet assisted synchronous reluctance motor using this structure can effectively reduce the torque ripple of the motor, effectively improve the efficiency of the motor of the permanent magnet assisted synchronous reluctance motor, and suppress the electromagnetic noise of the electric motor and improve the operation experience of the user.

The plurality of permanent magnet slots include an inner-layer permanent magnet slot 21. The first end of the inner-layer permanent magnet slot 21 and an end of one of the plurality of stator teeth 11 are arranged oppositely, as shown at f1 of FIG. 1. The second end of the inner-layer permanent magnet slot 21 and the stator slot 12 formed by the two adjacent stator teeth 11 among the remaining stator teeth 11 are arranged oppositely, as shown at f2 of FIG. 1. The middle of the inner-layer permanent magnet slot 21 is arranged to protrude toward one side of the shaft hole 40 of the rotor body 20. With such arrangement, it is possible to effectively improve the performance of the stator structure.

The plurality of permanent magnet slots further include an outer-layer permanent magnet slot 22. The outer-layer permanent magnet slot 22 is located outside the inner-layer permanent magnet slot 21. The first end of the outer-layer permanent magnet slot 22 and the first end of the inner-layer permanent magnet slot 21 are arranged adjacently. The first end of the outer-layer permanent magnet slot 22 and an end of the stator tooth 11 formed within both ends of the inner-layer permanent magnet slot 21 are arranged oppositely. The second end of the outer-layer permanent magnet slot 22 and the second end of the inner-layer permanent magnet slot 21 are arranged adjacently. The second end of the outer-layer permanent magnet slot 22 and the stator slot 12 formed within both ends of the inner-layer permanent magnet slot 21 are arranged oppositely. The middle of the outer-layer permanent magnet slot 22 is arranged to protrude towards one side of the shaft hole of the rotor body 20. With such arrangement, it is possible to further reduce the torque ripple of the motor.

As shown in FIG. 2, the rotor body 20 has a first quadrature axis d1 and a second quadrature axis d2. The first end of the inner-layer permanent magnet slot 21 and the first quadrature axis d1 are arranged adjacently. The second end of the inner-layer permanent magnet slot 21 and the second quadrature axis d2 are arranged adjacently. The distance between a surface of the first end of the inner-layer permanent magnet groove 21 proximate to the first quadrature axis d1 and the first quadrature axis d1 is D1, and the distance between a surface of the second end of the inner-layer permanent magnet slot 21 proximate to the second quadrature axis d2 and the second quadrature axis d2 is D2, where D1>D2. Among them, d is a direct-axis of the rotor structure. With such arrangement, it is possible to effectively suppress the torque ripple of the motor.

The geometric center line of the first end of the permanent magnet slot along a radial direction of the rotor body 20 coincides with the geometric center line of the stator tooth 11 along the radial direction of the stator body 10, and the geometric center line of the first end of the permanent magnet slot along the radial direction of the rotor body 20 coincides with the geometric center line of the stator slot 12 along the radial direction of the stator body 10. With such arrangement, it is possible to further suppress the torque ripple of the motor.

In some embodiments, an amount of stator slots 12 is Q, a pole number of the rotor body 20 is 2P, and a phase number of the permanent magnet assisted synchronous reluctance motor is m, where Q/2P/m=t, t∈(1.5, 2, 2.5, 3).

There are a plurality of inner-layer permanent magnet slots 21, which are arranged at intervals along a radial direction of the rotor body 20. With such arrangement, it is possible to effectively improve the performance of the motor structure.

The permanent magnet assisted synchronous reluctance motor further includes a permanent magnet 30. The permanent magnet 30 is disposed within the permanent magnet slot. Among them, there are a plurality of groups of permanent magnet slots, which are arranged at intervals along a circumferential direction of the rotor body 20. The two adjacent groups of permanent magnet slots include a first permanent magnet slot and a second permanent magnet slot adjacent to each other. The first end of the first permanent magnet slot and an end of one of the plurality of stator teeth 11 are arranged oppositely. The first end of the second permanent magnet slot adjacent to the first end of the first permanent magnet slot and the stator slot 12 formed by the two adjacent stator teeth 11 among the remaining stator teeth 11 are arranged oppositely.

The motor structure in the above-described embodiment can also be used in the technical field of devices of an electric car. That is, according to another aspect of the present disclosure, an electric car is provided. The electric car includes a permanent magnet assisted synchronous reluctance motor. The permanent magnet assisted synchronous reluctance motor is the permanent magnet assisted synchronous reluctance motor in the above-described embodiment.

Specifically, a stator and a rotor are contained, wherein the number of slots of the stator is Q, the pole number of the rotor is 2P, and the phase number of the power supply of the motor is m, the number of Q/2P/m is 1.5 or 2 or 2.5 or 3. With such arrangement, it is possible to effectively increase the modulus of a maximum electromagnetic force of the motor, reduce the vibration of the stator of the motor, and suppress the electromagnetic noise of the motor. The rotor of the motor contains a plurality of magnetic poles, each of which contains a plurality of layers of permanent magnets. The permanent magnets in the same magnetic pole have the same polarity in the direction toward the stator. The permanent magnet slots have a shape that protrudes toward the inside of the rotor. The center of one end of the same permanent magnet slot of the rotor is aligned with the center of the slot of the stator, and the center of the other end of the permanent magnet slot is aligned with the center of the stator tooth.

In two extremities of the innermost-layer permanent magnet in the same pole of the rotor of the motor, the distance between an extremity on a front side during rotation of the rotor (the direction of rotation is shown as f3 in FIG. 2) and a pole boundary is D1, and the distance between an extremity on a rear side during rotation of the rotor and a pole boundary is D2, wherein D1 is greater than D2. It is possible to improve a torque output of the motor under high current.

During rotation of the permanent magnet assisted synchronous reluctance motor, the change in the position of the rotor relative to the stator tooth and slot can bring a great torque fluctuation. When an extremity of the permanent magnet slot of the rotor directly faces the stator tooth, it is possible to greatly hinder the magnetic induction line of the stator from entering the rotor, and the instantaneous torque at this time is minimum. When an extremity of the permanent magnet slot of the rotor directly faces the stator slot, it is substantially impossible to hinder the magnetic induction line of the stator from entering the rotor, and the instantaneous torque at this time is maximum. In the present disclosure, the center of the extremity of the permanent magnet slot of the rotor is aligned with the stator tooth and slot respectively, which neutralizes a maximum value and a minimum value of the torque, and effectively reduces the torque ripple of the motor and in particular reduces the torque ripple when the motor rotates at a high speed and runs at a weakened field, thereby suppressing the electromagnetic noise of the motor.

Among them, in the extremities of any two adjacent permanent magnet slots of the rotor of the motor, the center of an extremity of one permanent magnet slot is aligned with the center of the stator slot, and the center of an extremity of another permanent magnet slot is aligned with the center of the stator tooth, which can better suppress the torque ripple of motor.

During operation of the motor under a heavy load, in the same pole of the rotor, the magnetic flux densities located on both sides of the center line of the pole are not the same. The magnetic flux density on a front side of the rotation direction of the rotor is higher, and the magnetic circuit of the rotor core is more saturated. The distance between the innermost-layer permanent magnet and the pole center line is set such that the width D1 on the front side is larger than the width D2 on the rear side, which can increase the torque output of the motor under a high current and improve the efficiency of the motor. Among them, the pole center lines of the rotor pass through the center of the rotor, and are perpendicular to the bottom of the permanent magnet slot. The pole boundary line of the rotor is located in the middle of the two pole center lines.

In addition to the above-described, it should also be noted that "one embodiment", "another embodiment", "an embodiment" and the like referred to in the present specification mean that specific features, structures or characteristics described in conjunction with the embodiment are included in at least one embodiment generally described in the present disclosure. The same definition appearing in multiple places in the specification does not necessarily refer to the same embodiment. Furthermore, when a particular feature, structure, or characteristic is described in conjunction with any embodiment, it is claimed that the implementations of such feature, structure, or characteristic in conjunction with other embodiments are also included in the scope of the present disclosure.

In the above-described embodiments, the descriptions of the various embodiments are oriented differently, and for the parts that are not described in detail in a certain embodiment, it is possible to refer to the related descriptions of other embodiments.

The foregoing descriptions are only preferred embodiments of the present disclosure, but do not serve to limit the present disclosure. For those skilled in the art, various modifications and changes may be made in the present disclosure. Any amendment, equivalent replacement, improvement, and the like made within the spirit and principles of the present disclosure should all be contained within the protection scope of the present disclosure.

What is claimed is:

1. A permanent magnet assisted synchronous reluctance motor, comprising:
    a stator body, wherein a plurality of stator teeth are provided on an inner circumferential surface of the stator body, and a stator slot is formed between two adjacent stator teeth;
    a rotor body disposed within the stator body and opened with a group of permanent magnet slots, which comprise a plurality of permanent magnet slots, wherein a first end of at least one of the plurality of permanent magnet slots and an end of one of the plurality of stator teeth are arranged oppositely, and a second end of the permanent magnet slot and the stator slot formed by two adjacent stator teeth among remaining stator teeth are arranged oppositely;
    wherein a geometric center line of the first end of the permanent magnet slot along a radial direction of the rotor body coincides with a geometric center line of the stator tooth along the radial direction of the stator body, and the geometric center line of the second end of the permanent magnet slot along the radial direction of the rotor body coincides with a geometric center line of the stator slot along the radial direction of the stator body.

2. The permanent magnet assisted synchronous reluctance motor according to claim 1, wherein the plurality of permanent magnet slots comprise:
    an inner-layer permanent magnet slot, wherein a first end of the inner-layer permanent magnet slot and an end of one of the plurality of stator teeth are arranged oppositely, a second end of the inner-layer permanent magnet slot and the stator slot formed by the two adjacent stator teeth among the remaining stator teeth are arranged oppositely, and a middle of the inner-layer permanent magnet slot is arranged to protrude toward one side of a shaft hole of the rotor body.

3. The permanent magnet assisted synchronous reluctance motor according to claim 2, wherein the plurality of permanent magnet slots further comprise:
    an outer-layer permanent magnet slot located outside the inner-layer permanent magnet slot, wherein a first end of the outer-layer permanent magnet slot and the first end of the inner-layer permanent magnet slot are arranged adjacently, and the first end of the outer-layer permanent magnet slot and an end of the stator tooth formed within both ends of the inner-layer permanent magnet slot are arranged oppositely, a second end of the outer-layer permanent magnet slot and the second end of the inner-layer permanent magnet slot are arranged adjacently, the second end of the outer-layer permanent magnet slot and the stator slot formed within both ends of the inner-layer permanent magnet slot are arranged oppositely, and a middle of the outer-layer permanent magnet slot is arranged to protrude toward one side of the shaft hole of the rotor body.

4. The permanent magnet assisted synchronous reluctance motor according to claim 2, wherein the rotor body has a first quadrature axis and a second quadrature axis, the first end of the inner-layer permanent magnet slot and the first quadrature axis are arranged adjacently, the second end of the inner-layer permanent magnet slot and the second quadrature axis are arranged adjacently, wherein a distance between a surface of the first end of the inner-layer permanent magnet slot proximate to the first quadrature axis and the first quadrature axis is D1, and a distance between a surface of the second end of the inner-layer permanent magnet slot proximate to the second quadrature axis and the second quadrature axis is D2, where D1>D2.

5. The permanent magnet assisted synchronous reluctance motor according to claim 2, wherein there are a plurality of inner-layer permanent magnet slots, which are arranged at intervals along a radial direction of the rotor body.

6. The permanent magnet assisted synchronous reluctance motor according to claim 1, wherein an amount of the stator slot is Q, and a pole number of the rotor body is 2P, and a phase number of the permanent magnet assisted synchronous reluctance motor is m, where Q/2P/m=t, t∈(1.5, 2, 2.5, 3).

7. The permanent magnet assisted synchronous reluctance motor according to claim 1, wherein the permanent magnet assisted synchronous reluctance motor further comprises:
    a permanent magnet disposed within the permanent magnet slot.

8. The permanent magnet assisted synchronous reluctance motor according to claim 1, wherein there are a plurality of groups of permanent magnet slots, which are arranged at intervals along a circumferential direction of the rotor body, wherein two adjacent groups of permanent magnet slots include a first permanent magnet slot and a second permanent magnet slot adjacent to each other, a first end of the first permanent magnet slot and an end of one of the plurality of stator teeth are arranged oppositely, and a first end of the second permanent magnet slot adjacent to the first end of the first permanent magnet slot and the stator slot formed by the two adjacent stator teeth among remaining stator teeth are arranged oppositely.

9. An electric car comprising a permanent magnet assisted synchronous reluctance motor according to claim 1.

\* \* \* \* \*